United States Patent
Agarwala et al.

(10) Patent No.: US 7,229,953 B1
(45) Date of Patent: Jun. 12, 2007

(54) PROCESS FOR REMOVING A COATING FROM A SUBSTRATE

(75) Inventors: Vinod S. Agarwala, Lexington Park, MD (US); Prithviraj Pole, Dallas, TX (US); Krishnan Rajeshwar, Arlington, TX (US)

(73) Assignee: Green Oaks Research Laboratories, Inc., Irving, TX (US)

( * ) Notice: Subject to any disclaimer, the term of this patent is extended or adjusted under 35 U.S.C. 154(b) by 0 days.

(21) Appl. No.: 11/257,937

(22) Filed: Oct. 25, 2005

Related U.S. Application Data

(60) Provisional application No. 60/621,969, filed on Oct. 25, 2004.

(51) Int. Cl.
*C11D 9/00* (2006.01)
*C09D 9/00* (2006.01)

(52) U.S. Cl. ................ 510/201; 510/372; 510/375

(58) Field of Classification Search ............ 510/201, 510/202, 203, 206; 8/2
See application file for complete search history.

(56) References Cited

U.S. PATENT DOCUMENTS

| 3,355,385 A | | 11/1967 | Mackley ................. 252/104 |
|---|---|---|---|
| 3,531,311 A | * | 9/1970 | Prior ..................... 427/154 |
| 3,766,076 A | | 10/1973 | Murphy .................. 252/156 |
| 3,980,587 A | | 9/1976 | Sullivan .................. 252/546 |
| 4,120,810 A | | 10/1978 | Palmer .................. 252/153 |
| 4,619,706 A | | 10/1986 | Squires et al. ............. 134/2 |
| 5,215,675 A | | 6/1993 | Wilkins et al. ............ 252/100 |
| 5,990,062 A | * | 11/1999 | Summerfield et al. ...... 510/204 |
| 2005/0079984 A1 | * | 4/2005 | Miles .................... 510/175 |

OTHER PUBLICATIONS

The Electrochemical Society, Inc., "Environmental Issues in the Electronics/Semiconductor Industries and Electrochemical/Photochemical Methods for Pollution Abatement," C.R. Simpson, L. Mendicino, K. Rajeshwar and J.M. Fenton, Proceedings vol. 98-5, pp. 232-235.

* cited by examiner

*Primary Examiner*—Douglas McGinty
*Assistant Examiner*—John M Petruncio
(74) *Attorney, Agent, or Firm*—Philip G. Meyers

(57) ABSTRACT

A process of stripping a coating according to the invention comprises subjecting a coated substrate to an aqueous medium containing a peroxide and an interfacial mixing agent, and to heating preferably by either ultraviolet (UV) and/or infrared (IR) radiation. The substrate is completely stripped of the coating and suffers no damage to itself as a result of the paint debonding/dislodging process. No toxic wastes are generated from this process, nor are particulates associated with air pollution generated. The metal substrates being stripped also do not undergo corrosion or other damage as a result of the described process.

12 Claims, 1 Drawing Sheet

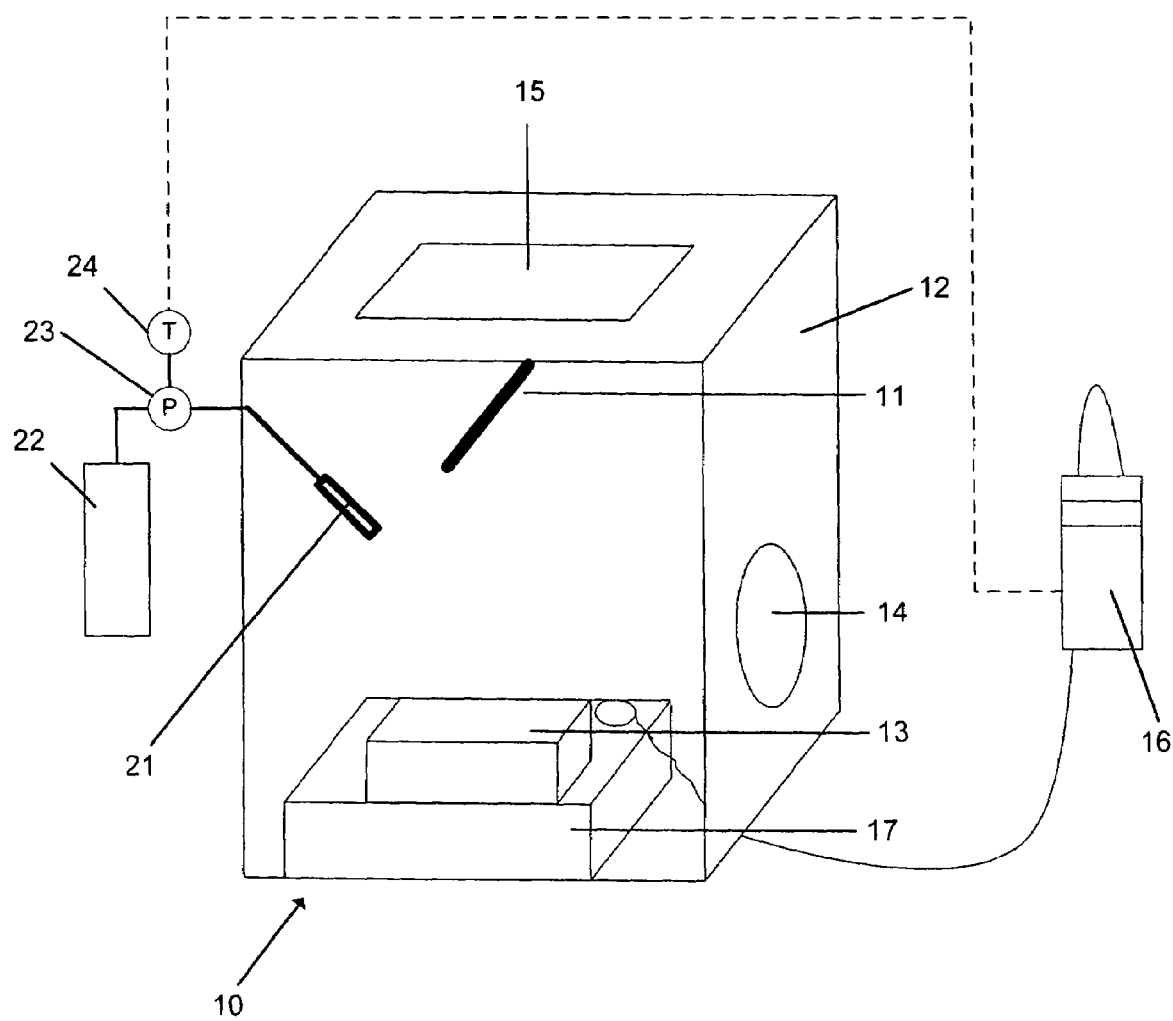

PROCESS FOR REMOVING A COATING FROM A SUBSTRATE

The application claims priority of U.S. Provisional Application No. 60/621,969, filed Oct. 25, 2004.

TECHNICAL FIELD

The invention described herein generally relates to the process and apparatus for stripping coatings such as paint from substrates such as metals.

BACKGROUND OF THE INVENTION

The invention described herein generally relates to processes for stripping coatings from various substrates such as metals, i.e., aluminum and steel; composites such as plastics, carbon-based substrates, ceramic tiles, wood, glass, fiberglass building materials and the like. Paint strippers typically used for removal of polymeric coatings contain solvents, water, surfactants, corrosion inhibitors, and viscosity modifiers. Solvents are typically volatile liquids or low-vapor pressure solvents that are not biodegradable. The surfactants are used to promote wetting and penetration of the coating. Viscosity modifiers are predominantly cellulose derivatives, though finely divided silica, clay and synthetic polymers can be used. Corrosion inhibitors are specific to the stripper composition and for protecting the metallic substrates involved. The more environmentally acceptable paint removers contain low vapor pressure solvents containing ammonia, amines, or organic acids; see U.S. Pat. No. 5,215,675 to Wilkins et al., which relates to a stripping composition containing peroxide. U.S. Pat. No. 3,355,385 relates to a process that uses hydrogen peroxide as the bond release agent for stripping organic coatings.

Automobiles and aircraft are painted to protect the substrates from corrosion and to enhance the cosmetic appearance to help market the product. The prior art has utilized many different compositions and methods for the removal of paint from different substrates. For example, some paint stripping compositions utilized highly caustic, alkaline solutions as demonstrated by Murphy in U.S. Pat. No. 3,766,076 and by Sullivan in U.S. Pat. No. 3,980,587. However, caustic solutions aggressively attack most metal substrates such as aluminum, steel, copper, zinc and chromium. The prior art utilizes various other volatile organic solvents, such as pyrrolidones as reported in U.S. Pat. No. 4,120,810 and phenyl ethers or ethoxylated alcohols as disclosed in U.S. Pat. No. 4,619,706.

Other known stripping methods use blasting processes with materials like plastics, starches, water and sometimes solvents. These methods not only produce large amounts of waste, which must be treated, but also generate a significant amount of airborne pollutants. With the proliferation of resinous coatings for the protection of metal and composite surfaces has come the need for a method of removing these types of coatings from their substrates without damaging the underlying material. It has been observed, for example, that strong acids are effective in removing these coatings, but their indiscriminate oxidation of the metal substrates makes acids undesirable and unacceptable in the majority of cases.

Several other techniques have been developed in attempts to satisfactorily remove paint coatings. One technique is to debond or dissolve the organic coating in a chemical solvent. While these solvents are often effective for debonding the paint coating from the substrate, they generate chemical waste such as stripping sludges, which result in disposal and pollution problems. Some organic stripping materials such as methylene chloride are effective as stripping agents and do little harm to underlying substrates. However, these chemicals pose additional problems such as toxicity, high volatility and flammability. While efforts have been made to minimize the problems associated with solvents, organic chemicals are still relatively inefficient, requiring large volumes of materials that must be disposed of in an approved manner upon completion of the stripping procedure. For example, conventional aircraft paint removal methods are increasingly under fire from many regulatory agencies, posing a problem for commercial and military operators. Moreover, some solvents such as methylene chloride are suspected human carcinogen agents, and the U.S. Environmental Protection Agency has classified these solvents as hazardous air pollutants. The costs associated with chemical stripping are astronomical, and the process is labor-intensive, consuming from a few hundred hours to as much as a few thousand hours depending on the aircraft part and the size of the aircraft. In addition, operational costs include special safety apparel, the cost of waste containment/disposal and facility/equipment maintenance costs. In most current practices, operational difficulties include the need for multiple chemical applications to remove the coatings, and a large degree of hand sanding in areas where the coatings remain after the chemical stripping.

More recently, other methods with lower environmental impact have been developed and generally fall into three categories: (a) the use of less toxic chemicals; (b) impact blasting of the paint coating including: plastic media blasting (PMB), laser stripping, aqua jet, $CO_2$-pellet blasting, starch or vegetable media blasting or ice-blasting; and, (c) vaporization of the paint via concentrated heat and/or light energy, e.g., laser stripping. Combinations of these methods also have been evaluated, including the FlashJet process wherein a pulsed xenon flash lamp initially vaporizes the paint coating into a fine ash residue. This residue is subsequently swept by a frozen carbon dioxide-pellet blast into a multistage collection system of filters and activated charcoal scrubber. However, these alternative methods, some of which are at a relatively mature stage of development, are not without problems. For example, the PMB procedure must be done in a closed system because of particulate generation and the potential for air pollution. The use of water as an impact medium as in the ice-blasting procedure, however, partially circumvents this difficulty. In general, the use of high-speed media jets in blasting procedures poses personnel safety and compliance issues. This is true even in the recently developed FlashJet process.

In view of these problems, there is a pressing need to develop novel approaches to paint stripping that are environmentally benign, pose minimal personnel safety problems, and are inexpensive. For delicate substrates of composites and honeycombs (e.g., radomes, helicopter rotor blades), the aforementioned methods like PMB or media blasting are not compatible because they will cause considerable damage to the substrate being stripped.

A laboratory version of a photochemical process for paint stripping has been described in *Proceedings of the Electrochemical Society*, Vol. 98-5, pp. 232–235, 1998). This study showed that the aqueous peroxide medium could be photochemically decomposed by UV light to generate gas bubbles within the polymeric coating. The present invention concerns a improved method for stripping paint based on either UV light and IR radiation in combination, or IR radiation alone. Modifications in the aqueous stripping medium to better facilitate coating debonding are also described.

SUMMARY OF THE INVENTION

The present invention relates to a method for removing organic coatings from various surfaces having a polymeric layer such as paint, varnish, sealant, lacquer and/or a chemical-biological agent resistant coating (CARC). It differs from prior art practices in that it uses a composition that is composed of non-toxic substances and a procedure that is operator friendly and non-invasive. More particularly, the invention provides a method of removing coatings in a manner that avoids corrosion of metals and degradation of composite substrates, avoids generation of environmentally hazardous wastes or particulate matter, and also strips paint with little or no manual labor and only minimally-trained personnel.

A process of stripping paint according to the invention comprises subjecting a coated substrate to an aqueous medium containing environmentally benign chemicals, and to heat preferably applied in the form of ultraviolet (UV) and/or infrared (IR) radiation. The substrate is completely stripped of the coating by this method and suffers no damage to itself as a result of the paint debonding/dislodging process. The metal substrates being stripped also do not undergo corrosion or other damage as a result of the described process.

A process for removing a coating from a substrate according to the invention includes the steps of:

(a) heating the coated substrate;

(b) applying a stripping solution containing a peroxide and an interfacial mixing agent to the coated substrate;

(c) waiting for separation of the coating from the substrate to occur; and then (d) stripping the coating off of the substrate.

The interfacial mixing agent provides a remarkable improvement in stripping action to the stripping solution, especially when the stripping solution is applied by spraying. The heating step (a) is most preferably done exposing the coated substrate to IR and/or UV light, but could be accomplished using other well known means of heating, e.g., convection heating. During step (c), blistering of the coating generally occurs as discussed further below. Step (d) is carried out to the extent necessary. Often as a result of the treatment much of the coating will fall off the substrate on its own, but some will remain and have to be peeled away, brushed off, or the like.

A process for removing a coating from a substrate according to another aspect of the invention includes the steps of heating the coated substrate, spraying a stripping solution onto the coated substrate in an amount and concentration effective to form gas pockets in situ at a coating-substrate boundary, whereby the coating is dislodged from the substrate, re-spraying the stripping solution over a period of time sufficient to form blisters indicating separation of the coating from the substrate, and then stripping the blistered coating off of the substrate. Spraying is highly effective for this purpose and compares favorably with immersion, even though only a thin layer of the stripping solution remains on the coated substrate over time. Use of the interfacial mixing agent is preferred but not essential to this embodiment of the invention. A chamber containing a UV and/or IR light source and facilities for spraying the solution is described in this invention. These and other aspects of this invention will become apparent from a further and more detailed description of the invention as set forth below.

BRIEF DESCRIPTION OF THE DRAWING

The drawing is a schematic illustration of a stripping chamber according to the invention.

DETAILED DESCRIPTION OF THE INVENTION

The invention uses either UV light or IR radiation in conjunction with an aqueous peroxide strip medium containing an interfacial mixing agent additive (e.g., polyethylene oxide or PEO) to generate gas pockets in situ at the paint/substrate boundary. These pockets grow in size till they exert pressure on the coating thereby dislodging it from the underlying substrate. In general, any approach to generate gas pockets within the coating would be effective. Microwave energy could, for example, be used to generate gas pockets. Additives other than PEO would also be effective in providing better contact of the aqueous strip medium with the hydrophobic coated surface.

The invention thereby results in the removal of coatings, e.g., water and oil based paint systems such as acrylics, alkyd paints, epoxides and polyurethanes, polyureas, and polyanilines, from any hard surface. These substrates include, but are not limited to, aluminum, steel, ceramic tile, wood, drywall/sheetrock and other building materials, and lightweight materials such as carbon, boron and fiberglass composites. The structural integrity of the underlying hard surface, e.g., composite substrate, is not compromised by the process of this invention.

A process for removing paint from a painted substrate in accordance with the foregoing includes the steps of heating the painted substrate by exposing it to effective wavelengths of electromagnetic radiation, e.g. ultraviolet and/or infrared light, coating the painted substrate with a stripping solution containing a peroxide and an interfacial mixing agent, waiting for blisters indicating separation of paint from the substrate to develop, and then stripping the blistered paint off of the substrate. The stripping solution preferably consists essentially of about 5 to 50 wt. % of hydrogen peroxide, 2 to 75 wt. % of an alkoxy polymer effective as an interfacial mixing agent, 0 to 2 wt. % of a surfactant effective as a wetting agent, and the balance water. From the standpoint of effectiveness and conservation of materials, a range of 2 to 50 wt. %, especially 2 to 10 wt. %, of the alkoxy polymer is most preferred.

The stripping solution must generally be re-applied many times in order to maintain the coating long enough so that blisters in the paint can form. In one example, the solution is sprayed on once every few minutes, e.g. at least every 5 or 10 minutes. The spaying increment will typically range from about 2 to 10 minutes, more typically 2 to 5 minutes. It could also be applied continuously in metered amounts. The duration of the treatment will vary depending on the nature of the coated substrate, but is typically at least about 30 minutes, more typically from 30 minutes to 6 hours, most typically from 2 to 4 hours. At the end of this time, the blistered paint can then be readily removed by physically peeling it off the substrate or brushing it off.

In the foregoing process, the temperature of the substrate must be sufficiently high, e.g. about 100° F. or higher, to catalyze the decomposition of the peroxide. In applications where the substrate temperature must be maintained under a certain level for safety reasons or to prevent damage to the substrate, the invention can takes advantage of evaporative cooling by applying additional stripping solution as needed to maintain the desired temperature. This is be done either by re-spraying the stripping solution more frequently than the normal time increment, or in the case of continuously applied stripping solution, by increasing the solution flow rate in response to an increase in temperature. For painted military aircraft parts, it is preferred to maintain the temperature in the range from 100° F. to 160° F. during the process.

The present invention can be used for stripping paint from delicate surfaces such as aircraft skins, radomes, helicopter rotor blades, or building materials made of wood, composites, or similar components. The strip medium provides good interfacial contact of an aqueous strip medium with hydrophobic, coated surfaces.

It is preferable to strip the coating from a substrate without substantial elevation of the temperature of the substrate, but as noted above, it has been found that heating accelerates the stripping process. Accordingly, the invention uses the evaporative cooling effect of spraying the strip medium on the substrate surface to cool the substrate, preferably to control the temperature of the substrate so that it remains within a target range. Within the target range, the stripping reaction is accelerated without damaging the substrate or create a risk of fire. The invention can strip coatings from surfaces of common metals used for parts fabrication without corrosion or other damage to the metal. The process of the invention is not labor-intensive and requires only minimally-trained personnel.

Hydrogen peroxide decomposes to water and dioxygen ($O_2$) either under UV light or by heat. The in-situ generation of $O_2$ creates gas pockets within the coating itself and at the coating/substrate boundary. The induction period associated with the coating debonding/dislodging process is associated with the rather slow diffusion of the $O_2$ from the boundary to within the coating matrix itself. The gas pockets ultimately reach dimensions that are sufficient to exert an outward pressure on the coating and in a manner that serves to dislodge the coating from the substrate.

The aqueous strip medium used in the invention contains a peroxide as active ingredient, preferably hydrogen peroxide. Other known peroxides that could be used include perborates, peroxiphosphates and persulphates, but these are not preferred because of cost considerations and the environmental effects of additional byproducts created. The concentration of peroxide can be varied from 5 to 50 wt. % as needed. This amount range is effective without wasting material. To reduce fumes that may affect the operator carrying out the process, a range of 5 to 30 wt. % of the peroxide is preferred. The hydrogen peroxide is sold typically in the form of an aqueous solution that is further diluted by the additional ingredients described below.

A second essential ingredient, especially when the strip medium is applied as a spray, is an agent effective for enhancing interfacial mixing of the aqueous strip medium and the coated surface. This hastens blistering of the coating as compared to an identical process lacking the interfacial mixing agent. Additives of this type include alkoxy polymers having both hydrophobic and hydrophilic character in the polymer chain, but of sufficiently low molecular weight to be liquid at room temperature. Polymers of this type include polyethylene oxide (PEO)/polyethylene glycol (PEG), a polymer having a morphology that depends on its molecular weight, ranging from a viscous liquid to a waxy solid. Lower molecular weights (such as from about 200–600, especially 380–420) are preferred for PEG or other interfacial mixing agent for the present application. Higher molecular weight polymers have problems associated with combustibility and intractability. Compounds similar to PEO (e.g., polypropylene oxide, PPO) may be used instead, although higher homologs are generally less tractable than PEO. Copolymer blends or mixtures of PEO and PPO can for example be used in the invention for the purpose of achieving better interfacial contact.

Other useful additives include one or more water soluble organic surfactants or wetting agents in total amounts preferably from about 0.1% to 2.0% by weight, especially 0.1 to 1.0 wt. % of a surfactant selected from non-ionic, cationic, or anionic surfactants. Specific examples of the surfactants or wetting agents include the anionics such as water soluble alkylaryl sulfonates wherein the alkyl substituent varies from $C_2$ through $C_{12}$ carbon atoms and the aryl substituent may be phenyl or naphthyl, such as dodecylbenzene sodium sulfonate. The non-ionic surfactants include alkylphenylethylene oxide condensates wherein the alkyl substituent may vary from $C_2$ through $C_{20}$ and the number of moles of condensed ethylene oxide units varies from 1 to 100 per mole of alkyl, such as octylphenyl polyethoxy ethanol sold under the trademark Triton. The cationic surfactants include the straight chain alkyl fatty amines in which the alkyl group varies from 2 to 12 carbon atoms. Preferably the surfactants are biodegradable and include compounds such as sodium oleate, linear alkyl ethoxylate, or petroleum sulfonate, used especially for wetting large objects.

Finally, the strip medium can be modified to include agents to enhance UV or IR absorption. These could include chemical compounds containing chromophoric groups that absorb strongly in the UV and IR regions. Organic ketones are examples of such compounds. It must be noted that these compounds are photochemically decomposed and are mineralized (to harmless products) such that the strip medium waste will not be environmentally harmful. Further, these additives if used should always be present in very small concentrations in the medium.

For the thermochemical stripping process according to the invention, the UV source uses either Hg or Xe arc lamps and the IR lamp utilizes ceramic heating elements which emit black-body radiation. Preferably a chamber is constructed to mount the UV and IR sources and spray nozzles for the strip medium, and to contain the workpiece to be stripped. The coating step could be performed by coating the stripping solution on with an applicator, but spraying it on is much preferred.

The drawing illustrates an example of an apparatus 10 for carrying out the process of the invention. An IR lamp 11 manufactured by Glenro Inc, Paterson, N.J. (model HTRO32B122410SP, 2.0 KW12W24) is mounted at the top of a test chamber 12 with the substrate 13 positioned directly below it. A fan 14 mounted on a side wall of chamber 12 served to control the temperature attained at the substrate locale via mainly radiative heating from the light source. Fan 14 is mounted to blow room air into test chamber 12 which air can exit via a ventilation opening 15 in a top wall of the chamber 12. A Type K chromel/alumel thermocouple 16 was used to monitor the temperature. A tray 17 served to collect the (minimal) liquid effluents generated by the strip process. An optional spray nozzle 21 may be provided to carry out timed spraying of the strip medium from a reservoir 22 and a suitable actuator, e.g., a pump 23 operated by a timer 24, and/or one connected to operate in response to activation of thermocouple 16. The substrate 13 may be positioned in chamber 12 through opening 15, which is used as an access opening for that purpose, or an opening in one of the sidewalls of chamber 12 which can be closed by a door.

The foregoing apparatus is effective for removing the coating from the top surface of the substrate. The substrate must be turned over and the process repeated for the other side. For substrates painted on all sides, it is generally necessary to run the process at least twice, repositioning the substrate between runs to ensure than the entire coating is removed.

EXAMPLE 1

The setup for this example is shown schematically in the drawing, except that the strip medium was applied manually (no spray nozzle was provided). The substrate was a helicopter rotor blade coated with military grade alkyd primer MILPRF23377 Type I, Class C and an acrylic paint topcoat designated CARC MILC46168 Type IV, #37038, Black. The distance from the light source to the test substrate could be varied via spacers from 12 to 24 inches, most preferably 12 to 20 inches, and was set at 16 inches in this example.

The strip medium comprised of a mixture of 70% by volume of a technical grade 35% $H_2O_2$ solution (Scientific Industrial Sales and Service, Fort Worth, Tex.) and 30% by volume of polyethylene oxide (polyethylene glycol, PEO) (Aldrich, molecular weight: ca. 400). The strip medium was sprayed on the painted substrate every 3 minutes for a total time of 220 minutes as the substrate was heated by the IR lamp. However, the strip medium was sprayed more often than every 3 minutes whenever necessary to keep the substrate temperature below a target level of 160° F. as measured by the thermocouple. As spraying proceeded, blisters formed on the painted substrate and grew progressively in size. At the end of 220 minutes, the paint coating had substantially separated from the underlying surface. After permitting the sample to cool, it was removed from the test chamber and the paint was manually peeled away, leaving a clean surface suitable for repainting.

EXAMPLE 2

Stripping of helicopter rotor blades was carried out using the same strip medium as in Example 1. The IR light source was a 2 ft.×4 ft., 4 Kw infrared lamp used at a distance of about 17 inches from the surface of the substrate. The IR light source emitted IR light in a range of 2.6 to 7.0 microns. The temperature at the substrate surface level was controlled to remain within a range of 122° F.+/−4° F. The strip medium was sprayed on the substrate to be decoated according to two procedures. First, spraying was performed by default every 150 seconds, that is, 150 seconds since the last spraying occurred. Second, spraying was done whenever the temperature reached the upper limit of the target temperature range, in this case 122° F.+4° F. (126° F.). At that point, the spraying of the substrate occurred, the IR light was turned off and an air blower turned on to reduce the temperature at the substrate level to the lower limit of the target temperature range, 118° F. (122° F.−4° F.). At that time, the IR light source was turned on again and the air blower turned off. This process continued for 150 minutes. After that time, the substrate was removed from the chamber. Most of the coating had fallen away from the substrate surface and only a small amount had to be removed by hand. This process was repeated a number of times on different substrates with successful stripping in each case.

The conditions of the foregoing examples are varied depending on the nature of the substrate and the composition of the stripping solution. For radomes, a preferred stripping solution is 60% peroxide, 35% PEO and 5% distilled water with a target maximum temperature of 140° F. For aluminum substrates, a preferred stripping solution is 50% peroxide, 40% PEO and 10% distilled water with a target maximum temperature of 160° F.

While certain embodiments of the invention have been illustrated for the purposes of this disclosure, numerous changes in the method and apparatus of the invention presented herein may be made by those skilled in the art. Variations are within the scope of the invention as defined in the appended claims.

The invention claimed is:

1. A process for removing a coating from a substrate, comprising:
   (a) heating the coated substrate;
   (b) intermittently spraying a stripping solution containing a peroxide and an interfacial mixing agent onto the coated substrate, the stripping solution consisting essentially of 5 to 50 wt. % of hydrogen peroxide, 2 to 75 wt. % of polyethylene glycol having a molecular weight between about 200–600, and the balance being water, the solution containing essentially no toxic substances;
   (c) maintaining the substrate at a temperature not exceeding a target maximum temperature, wherein evaporative cooling is used to control the temperature of the substrate;
   (d) waiting for separation of the coating from the substrate to occur; and
   (e) then stripping the separated coating off of the substrate.

2. The process of claim 1, wherein step (a) comprises exposing the coated substrate to effective wavelengths of electromagnetic radiation.

3. The process of claim 2, wherein the electromagnetic radiation comprises one or both of infrared light and ultraviolet light.

4. The process of claim 1, wherein the substrate is a vehicle or part thereof.

5. The process of claim 4, wherein the coating comprises one or more layers of paint.

6. The process of claim 1, wherein the substrate is steel or aluminum.

7. The process of claim 1, wherein the substrate is a composite material.

8. The process of claim 7, wherein the substrate is a carbon-based honeycomb or laminate.

9. The process of claim 1, wherein the coating on the substrate comprises polyurethane or acrylic resin.

10. The process of claim 1, wherein step (b) comprises spraying the stripping solution onto an exposed surface of the coated substrate, the substrate further having a non-exposed surface that spraying of the stripping solution does not effectively reach; and
    the process further comprises the steps of:
    (f) repositioning the substrate so that the non-exposed surface can be sprayed with the stripping solution; and
    (g) then repeating steps (a) to (e) on the repositioned substrate.

11. The process of claim 1, wherein step (b) is carried out over a period of time sufficient to permit blisters to form in step (d).

12. The process of claim 1, wherein steps (b) to (d) are carried out at least every 10 minutes for from 30 minutes to 6 hours.

* * * * *